United States Patent
Leinung

(10) Patent No.: US 7,908,055 B2
(45) Date of Patent: Mar. 15, 2011

(54) CONTROL DEVICE FOR A COMPRESSED AIR SYSTEM OF A VEHICLE

(75) Inventor: Andreas Leinung, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/687,428

(22) Filed: Jan. 14, 2010

(65) Prior Publication Data
US 2010/0174452 A1    Jul. 8, 2010

Related U.S. Application Data

(63) Continuation of application No. PCT/EP2008/005475, filed on Jul. 4, 2008.

(30) Foreign Application Priority Data

Jul. 16, 2007  (DE) .................. 10 2007 032 970

(51) Int. Cl.
*B60T 17/02* (2006.01)
*B60K 25/00* (2006.01)
(52) U.S. Cl. .............................. 701/36; 701/207
(58) Field of Classification Search .............. None
See application file for complete search history.

(56) References Cited

U.S. PATENT DOCUMENTS

| 4,361,204 A * | 11/1982 | Earle ................... 180/302 |
| 5,832,400 A * | 11/1998 | Takahashi et al. ....... 701/53 |
| 6,292,726 B1 * | 9/2001 | Gustavsson ............ 701/36 |
| 6,682,459 B1 * | 1/2004 | Knight ............... 477/183 |
| 2005/0251332 A1 * | 11/2005 | Entenmann et al. ..... 701/208 |

FOREIGN PATENT DOCUMENTS

| DE | 197 14 513 A1 | 10/1998 |
| DE | 10 2005 005 002 B4 | 8/2006 |
| GB | 2133580 A * | 7/1984 |
| WO | WO 98/07588 A1 | 2/1998 |
| WO | WO 2006/071170 A1 | 7/2006 |

OTHER PUBLICATIONS

German Office Action dated Oct. 1, 2008 Including English translation (Eight (8) pages).
International Search Report dated Oct. 22, 2008 Including English translation (Four (4) pages).

* cited by examiner

*Primary Examiner* — Michael J. Zanelli
(74) *Attorney, Agent, or Firm* — Crowell & Moring LLP

(57) ABSTRACT

A control device for a compressed air system of a vehicle or for a component of a compressed air system of a vehicle includes at least one processor calculating a prediction of the occurrence and/or duration of overrun condition phases of the vehicle based on altitude position data of a route traveled by or still to be traveled by the vehicle. The control device controls the compressed air system, a component of the compressed air system, or a component intended to operate the compressed air system, based on the calculated prediction.

46 Claims, 9 Drawing Sheets

CONTROL DEVICE FOR A COMPRESSED AIR SYSTEM OF A VEHICLE

CROSS REFERENCE TO RELATED APPLICATIONS

This application is a continuation of PCT International Application No. PCT/EP2008/005475, filed Jul. 4, 2008, which claims priority under 35 U.S.C. §119 to German Patent Application No. 10 1007 032 970.0 filed Jul. 16, 2007, the entire disclosures of which are herein expressly incorporated by reference.

This application contains subject matter related to U.S. application Ser. No. 12/687,452, entitled "Method and Device for Determining Overrun Conditions of a Vehicle," and to U.S. application Ser. No. 12/687,631, entitled "Apparatus and Method for Identifying in Advance Overrun Phases of a Vehicle," both filed on even date herewith.

BACKGROUND AND SUMMARY OF THE INVENTION

The invention relates to the field of the manufacture and the method of operation of vehicles and vehicle components. In particular, the invention relates to land vehicles for daily road traffic, in particular motor vehicles, such as, for example, utility or commercial vehicles. The invention relates, in particular, to a control device for a compressed air system of a vehicle. The terms commercial vehicle and utility vehicle are used interchangeably herein.

Vehicles in daily road traffic frequently travel temporarily in overrun conditions depending on the instantaneous speed, acceleration of the vehicle (positive or else negative, for example in the case of braking) or other external influences such as interventions by the driver.

Overrun conditions means here the drag mode of the engine as a result of the kinetic energy of the vehicle which is fed in via the closed drivetrain. The vehicle, which at the time of the overrun conditions has more kinetic energy than the engine is making available at that moment, drags the engine, i.e. attempts to accelerate it.

On a flat road surface, what are understood to be overrun conditions are possible only if the driver brakes the vehicle by taking his foot off the gas pedal. On a negative gradient, these overrun conditions can occur for a relative long time either with a positive or negative vehicle acceleration or with a constant velocity depending on their degree and the driver's reaction at the gas pedal.

Overrun condition phases only make up a relatively small proportion of the entire travel time. In particular, hitherto it has not been possible to predict when overrun conditions will occur in a vehicle since the behavior of the driver has a significant influence on this. However, the driving behavior of the driver is not predictable, for which reason there is conventionally no possible way of predicting any possible overrun condition phases before they actually occur. The uncertainty in terms of the future or imminent driving behavior of the driver and therefore his vehicle prevents overrun condition phases which occur from being utilized technically more efficiently. Vehicle components can be controlled in a changed way only in the case of an overrun condition phase which has already commenced and is still continuing. However, conventionally there is also uncertainty here about the duration for which an overrun condition phase, which has already commenced, will still continue since, apart from the driver's reaction, the future operating states of the vehicle, which are partially conditioned by the section of road, are unknown. This limits the possibilities of optimizing control of vehicle components. Owing to the many unpredictable influences, there is not yet any way of overcoming the above-mentioned limitations with respect to the control and method of operation of vehicle components.

In particular, compressed air systems such as are necessary, for example, for a brake system can conventionally be controlled only with the above restrictions.

The object of the present invention is to utilize prior knowledge of overrun condition phases in vehicles, in particular of land vehicles such as, for example, road vehicles, to control a compressed air system, for example, for a brake system. The intention is in particular to make available a device which is suitable for this.

The present invention makes it possible for the first time to utilize the cartographic altitude positions of a section of road, i.e. its local altitude coordinates (in the perpendicular direction with respect to the surface of the earth) in a technical manner in order to predict the occurrence of overrun condition phases of a mobile vehicle and therefore to control a compressed air system, for example a brake system of a commercial vehicle. Hitherto, navigations systems in mobile vehicles were used only to provide the driver with an orientation in the two-dimensional road network and to calculate the shortest or the fastest route for the purpose of route planning. Altitude coordinates do not play a role in this since the vehicle is tied to the respective road and must necessarily follow its altitude profile; only the horizontal coordinates parallel to the surface of the earth (in the positive y/x directions and in the North/South/East/West directions) are significant for the instantaneous position of the vehicle in the road network and for the resulting shortest route (the profile of which is correspondingly also represented only two-dimensionally). Conventionally, altitude coordinates are also not utilized in a technical manner to control a component of a vehicle, but rather exclusively for finding the route to a destination.

On the other hand, the invention permits for the first time optimization of the operational sequence or the control processes of the vehicle, in particular of a component of the vehicle such as, for example, a compressed air system, in particular a brake system, as a function of parts of a section of road lying ahead of the vehicle which have negative gradients. Conventionally, only the parameters of the actual vehicle which indicate the respective operating states of the vehicle components are used as influencing variables for controlling and optimizing them but not the cartographic data of a section of road being traveled on. The invention permits vertical position coordinates of the section of road and/or of the vehicle to be included in order to calculate in advance the future driving behavior of the vehicle and, in particular, calculate a prediction about the overrun condition phases that are expected to occur. On the basis of said overrun condition phases it is possible to improve the control of one or more vehicle components. It is therefore possible, for example, to detect in advance whether and when an overrun condition phase, which continues for a relatively long time, is imminent, during which phase a control process, switching process or other working step of a vehicle component can be carried out without consuming energy or with relatively low consumption of energy. While the imminent driving behavior of the driver is conventionally considered to be unpredictable, the present invention permits a qualitative technological advance in terms of the control and method of operation of vehicle components taking into account influencing variables which lie outside the vehicle itself. Any desired vehicle components, in particular components of road-bound vehicles, for example of utility vehicles, can benefit from this.

In particular, it becomes possible to detect overrun conditions or overrun condition phases in advance and to utilize them technically in the vehicle. In particular, phases in which the vehicle engine of the traveling vehicle receives, via its connection to the vehicle wheels, an additional torque, which has the effect of increasing the engine speed, can be utilized for energy-saving or energy-free execution of a control process, switching process or other working step of any desired vehicle component.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
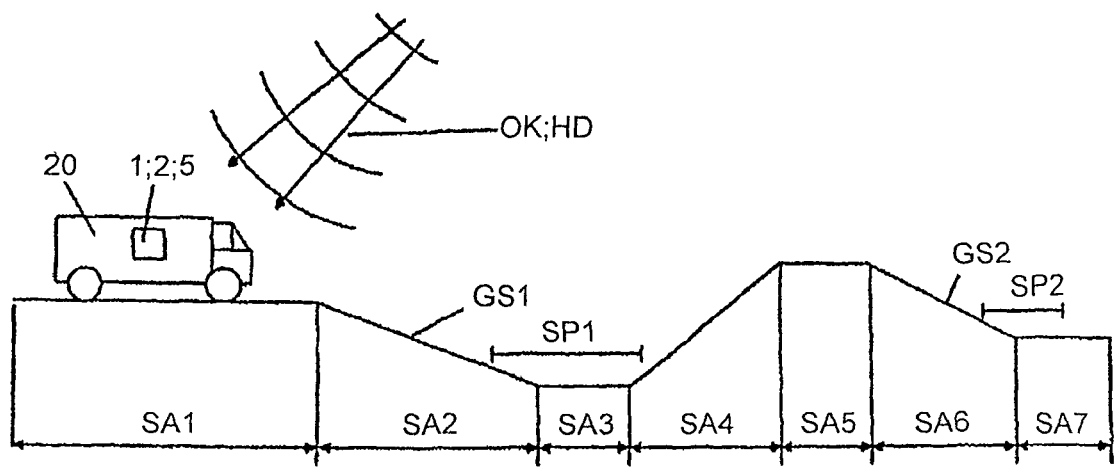
FIG. 1 is a schematic illustration of a vehicle having the device according to the invention.

FIG. 1 is a schematic view of a vehicle 20 which is equipped with the device 1 according to the invention, traveling on a section of road F. The device 1 is constructed in such a way that it can receive altitude (height) position data (HD) and preferably also instantaneous location coordinates OK; x, y, L of the traveling vehicle and process them to form a prediction about the occurrence and/or the chronological duration of overrun condition phases in the future. Conventionally, at most the geographic location coordinates OK, which indicate the instantaneous position x; y of the vehicle, are evaluated for the purpose of orientation in road traffic, especially since the vehicle must inevitably follow the altitude profile of the road, and therefore no possibilities of influencing the selectable routes of the road network arise from the altitude position data.

However, according to the invention, the altitude position data are principally processed to form a prediction for overrun condition phases which cannot conventionally be detected in advance. FIG. 1 is a schematic view of section-of-road segments GS1, GS2 with a negative gradient which lie ahead of the vehicle on the road section. A prediction of future and/or instantaneous, still continuing overrun condition phases is calculated. These overrun condition phases will generally coincide spatially and chronologically only to a certain degree with the segments of the section of road with a negative gradient since usually further vehicle parameters or their instantaneous values also exert an influence on the operating states of the vehicle and its vehicle components during travel.

In FIG. 1, the section of road is divided in a simplified fashion into a plurality of segments SAn of the section of road. In addition, FIG. 1 illustrates by way of example two future overrun condition phases SP1, SP2, with the first overrun condition phase SP1 even overlapping spatially with a segment SA4 of the section of road having a positive gradient in the direction of travel which tends to counteract overrun conditions. The first overrun condition phase overlaps simultaneously with parts of the section of road which coincide in the direction of travel with a positive gradient (for SA4), with parts of the section of road which coincide with a section of road having a negative gradient (for SA2) and with parts of the section of road which coincide with a horizontal section of road profile without a negative gradient or a rise in altitude (for SA3). The prediction, which is calculated by the device, therefore generally does not equate the sections of road with a negative gradient only with overrun condition phases, but also takes into account in the calculation and prediction of the overrun condition phases a relatively complex dependence between the two, with further vehicle parameters usually also being included in the calculation.

Any desired vehicle component FK of the vehicle 20 can be controlled by the device 1 which has the processing unit 2 and preferably also a control unit 5 (which is separate or integrated into the device or the processing unit thereof or into another component of the device).

Figure 2:
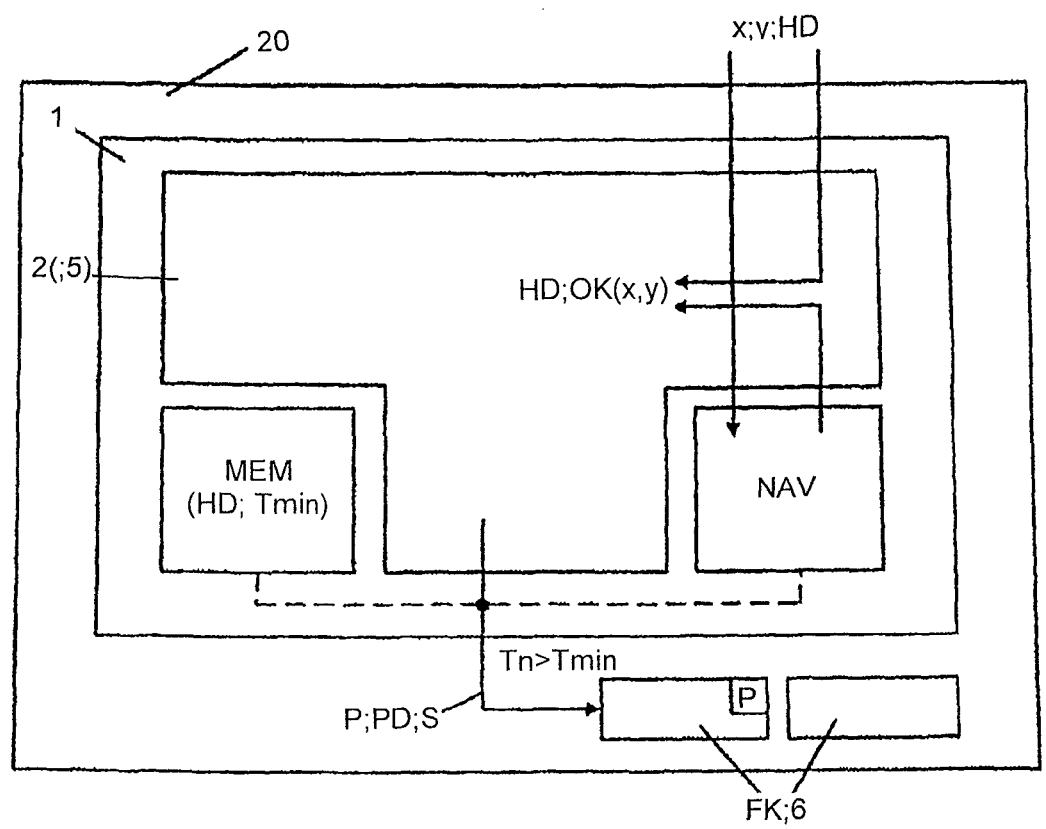
FIG. 2 is a schematic illustration of a first embodiment of the device according to the invention.

FIG. 2 is a schematic view of an embodiment of the inventive device 1 of the vehicle 20 or for a vehicle 20 (i.e. before installation in the vehicle). The device 1 includes a processing unit 2 which processes the altitude position data HD of a section of road F which is to be traveled along. This processing is used to calculate a prediction P about principally future overrun condition phases SPn, in which case the prediction is output in the form of prediction data PD and/or control signals S. The prediction data PD and/or control signals S can be transmitted for example from the processing unit 2 to at least one vehicle component FK which is to be controlled. In the component FK or in the actual device according to the invention it is also possible to store vehicle parameters p which are also taken into account in the control process.

In addition, the device 1 may include a navigation system NAV, which is used to receive the altitude position data HD and preferably also the location coordinates OK; x, y; L of the vehicle 20 (in particular when it is already traveling). In this way, it is possible for the prediction as to which overrun condition phases are expected to occur to be calculated and to be detected in advance before or during travel and to be included in the control of vehicle components FK in advance.

The device 1 may also include a memory device MEM, which is used to store, for example, the altitude position data HD or vehicle parameters p. In addition, the instantaneous location coordinates OK of the traveling vehicle can also be stored in the memory device MEM during travel. A limiting value Tmin for the minimum chronological duration of overrun condition phases above which technical utilization of the respective overrun condition phases are intended to first take place can also be stored in the memory device MEM. The units MEM and/or NAV can also be integrated into the processing unit 2 or embodied as separate units outside the device 1.

Figure 3:
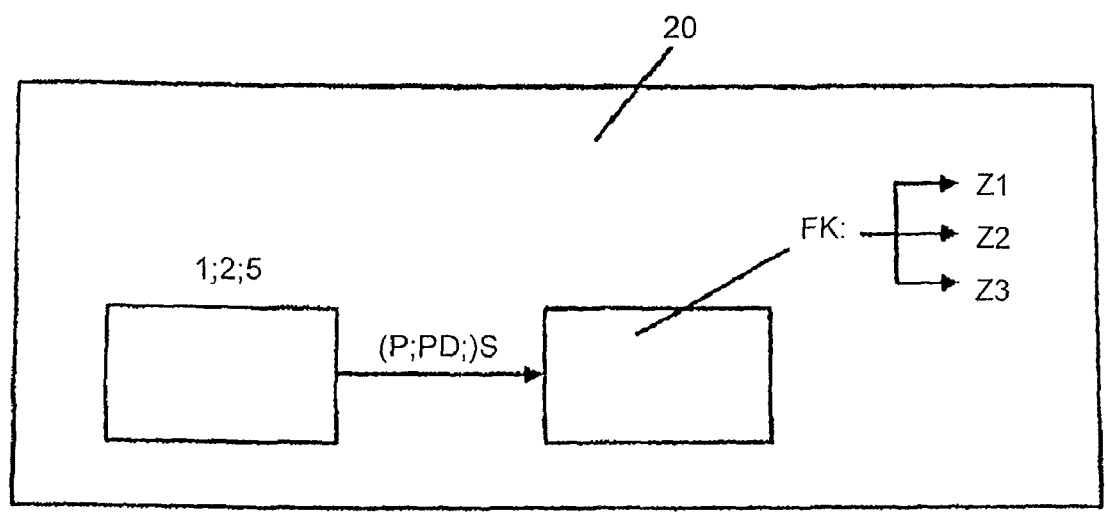
FIG. 3 shows the control of any desired vehicle component of the vehicle by way of the device according to the invention.

FIG. 3 is a schematic view of the control of any desired vehicle component FK of the vehicle 20, which is made possible by way of the device 1 according to the invention and is carried out taking into account altitude position data. As a result of the prediction, control signals S are transmitted to the vehicle component FK or to the control device thereof, in order to control the vehicle component taking into account predicted overrun condition phases. Future overrun condition phases (or future parts of an overrun condition phase which is still continuing at that instant) are not taken into account in the control process. As a result of the control process which is optimized according to the invention, it is possible, for example, to make the decision as to whether and when a vehicle component is to be operated in a first operating state Z1, a second operating state Z2, or in another further operating state Zn, taking into account future overrun condition phases. The control of the vehicle components can therefore be improved. Therefore, it is possible, for example when the chronological duration of a future overrun condition phase is expected to exceed an envisaged minimum duration Tmin, to operate the vehicle component in the state Z1 during this overrun condition phase or temporarily during this overrun condition phase and otherwise operate it in other states. In addition, the vehicle component can be controlled in various ways, in particular, in terms of the method and functioning of the respective states and the decision as to which state is to be assumed at what time. The vehicle components can be, for example, a compressed air system, a brake system, a dynamo or any other desired component of a vehicle, in particular of a utility vehicle.

Figure 4A:
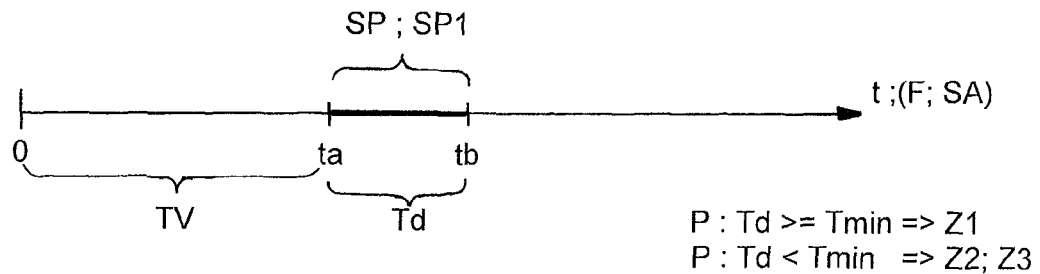
FIGS. 4A to 4C show a plurality of embodiments relating to the chronological calculation in advance of overrun condition phases.
Figure 4B:
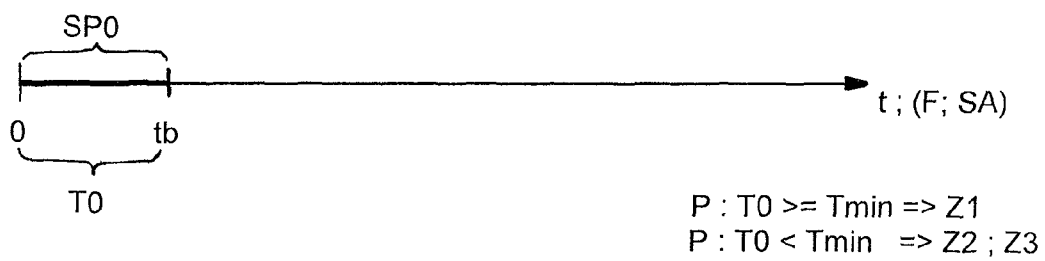
Figure 4C:
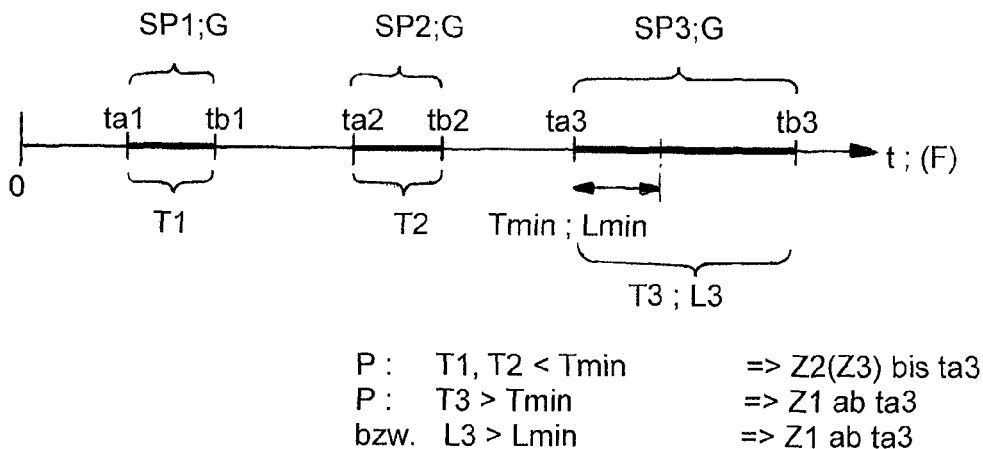

FIGS. 4A to 4C show by way of example a number of embodiments (which can also be combined with one another) of the invention relating to the chronological calculation of overrun condition phases in advance. In each case a time line, starting with the present time t=0 and for a future time period t>0 is represented. This time period can constitute a time period which is provided for traveling along a section of road F which is to be traveled along or is envisaged or a segment SA of a section of road lying ahead, and corresponds at the same time to the travel coordinate (for example the expected km reading) of the vehicle along the section of road F or of the respective next segment SA of the section of road lying ahead.

According to FIG. 4A, an overrun condition phase SP or a first, imminent overrun condition phase SP1 is calculated in advance for this or for a directly imminent time period (of the order of magnitude of, for example, several seconds up to a number of minutes). In this context it is possible, for example, to determine a section of road with a negative gradient by means of the altitude coordinates of the section of road. However, the chronological or spatial start of the overrun condition phase does not have to correspond to the start and end of the section of road with a negative gradient, but rather can deviate from the section of road with a negative gradient owing, for example, to initial parameter values of the vehicle when the section of road with a negative gradient is reached and the further effect thereof.

In FIG. 4A, after a time period TV, the occurrence of the overrun condition phase SP or SP1 is calculated in advance, with an expected starting time to and finishing time tb and a time period Td. This prediction P permits technical utilization of the overrun condition phase. In addition, it is possible to check whether the expected duration Td of the overrun condition phase exceeds a predefined minimum duration Tmin. In addition, the control (of any desired vehicle component) can be carried out in such a way that the overrun condition phase is also actually technically utilized, on the condition that the duration Td of the overrun condition phase is longer than the minimum duration Tmin (instead of, at any rate, independently of the duration Td of the overrun condition phase).

An overrun condition phase can be utilized, for example, by virtue of the fact that a vehicle component or any other desired device on or in the vehicle is switched from a first state Z1, which is present, for example, chronologically outside overrun condition phases, into a second state Z2 or into further states Z3. This switching to Z2 or Z3 can also take place or be provided for just part of the duration Td of the overrun condition phase SP (instead of continuously during the entire time period Td). In particular, a technical process can be chronologically synchronized in such a way that it is carried out within the time period between to and tb (even for a relatively short time period).

Likewise, further subsequent overrun condition phases can already be calculated in advance; in FIG. 4A, just a single subsequent overrun condition phase which is calculated in advance is represented for the sake of simplicity.

As is illustrated in FIG. 4B, it is also possible to calculate, for an overrun condition phase which has already started and which is still continuing at the particular instant, i.e. at the time t=0, a prediction for the still remaining duration T0 of this overrun condition phase or the finishing time tb thereof. Technical utilization of the overrun condition phase (for example by switching a component into a state other than Z1) can be brought about, for example, or preferably brought about, when the predicted further duration T0 is expected to exceed a minimum duration Tmin. A combined prediction for overrun condition phases which are continuing at present and overrun condition phases in the future can also be generated according to FIGS. 4A and 4B.

According to FIG. 4C, for instantaneous and/or future overrun condition phases SP1, SP2 whose chronological duration T1, T2 is respectively expected to be smaller than a predefined chronological minimum duration Tmin and which precede a calculated, earliest future overrun condition phase SP3 with a longer duration T3 than Tmin, it is possible to prevent the technical utilization of the preceding overrun condition phases SP1, SP2. In this context, the recognition, which is acquired by means of the prediction, that an overrun condition phase SP3 which will still continue for a relatively long time and which permits even more efficient or more energy-saving technical utilization than the preceding overrun condition phases SP1, SP2 with a relatively short duration, is to be expected. The technical utilization of a respective overrun condition phase can take the form, for example, of obtaining energy and/or storing energy in or for any desired vehicle component. The chronological duration of an overrun condition phase can also be expressed in the form of a segment of a section of road which is expected to be passed through in overrun conditions, for example for the overrun condition phase SP3 in, for example, the form of a length Lmin of the section of road (which is longer for this overrun condition phase SP3 than a predefined minimum length Lmin of a section of road). The technical utilization can in turn occur, for example, in the form of switching of a component into another state, for example (conversely to that explained by means of FIGS. 4A and 4B) to Z1 (instead otherwise Z2 or Z3), or vice versa.

Of course, the technical utilization of overrun condition phases can (and generally does) take place taking into account further vehicle parameters or component parameters. The chronological sequence and duration for the overrun condition phases which are calculated in advance and also those overrun condition phases which are not detected in advance, but rather are also actually utilized technically, therefore generally constitutes not only a mapping of the altitude profile of the section of road which is being traveled along or is to be traveled along but also results from a relatively complex dependence on a multiplicity of influencing variables, the altitude profile of the section of road constituting one of these influencing variables.

Figure 5:
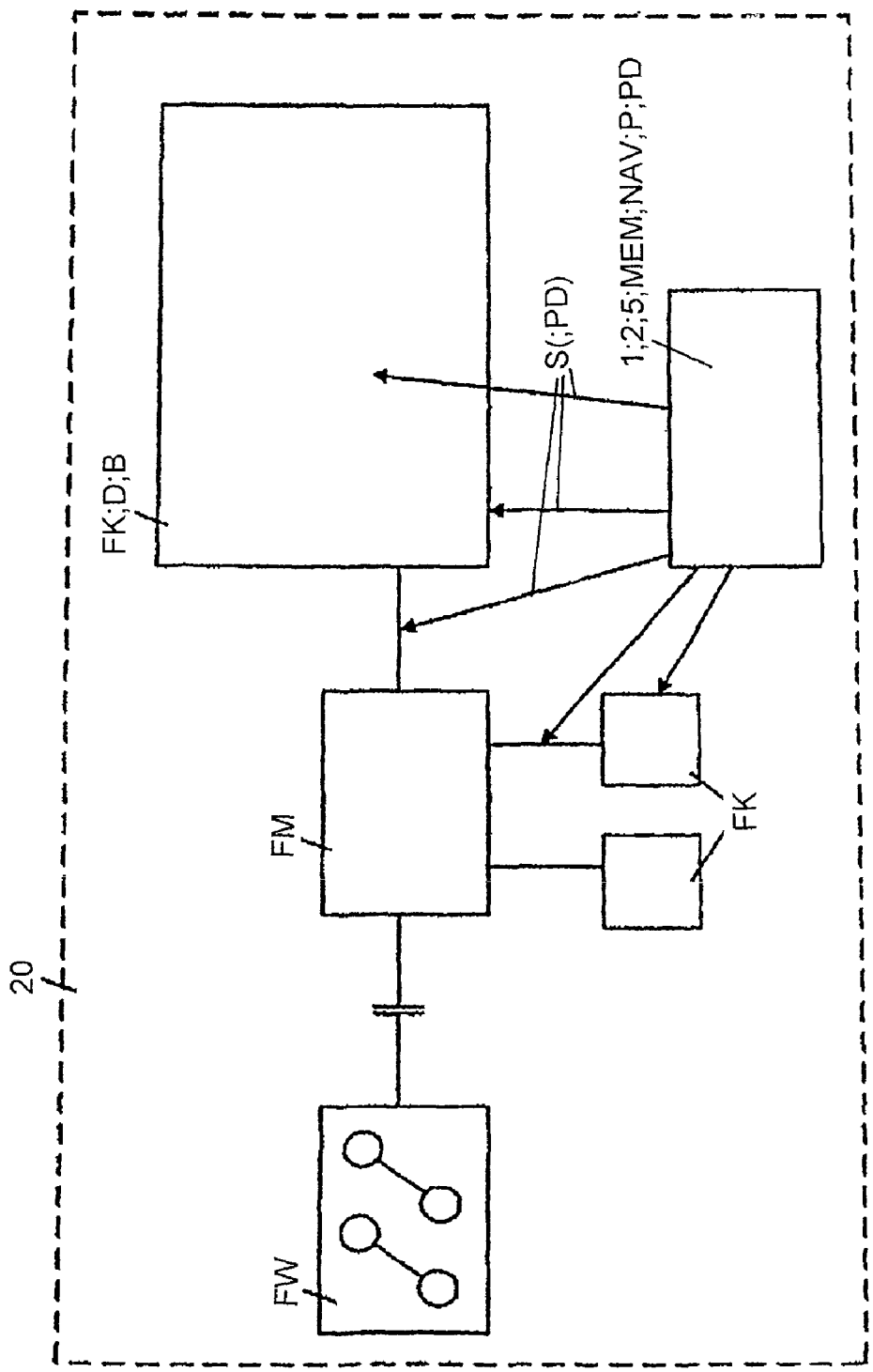
FIG. 5 is a schematic illustration of components of a vehicle having the device according to the invention according to an embodiment.

FIG. 5 is a schematic view of a number of components on a vehicle with the control device 1 (or device) according to the invention in a possible embodiment. The component which is controlled taking into account overrun condition phases can, in particular, be a compressed air system D, for example a brake system B. It is additionally also possible to control further vehicle components FK by way of the control device 1. The control device 1 is illustrated outside the vehicle components FK in FIG. 5 but can also be integrated completely or partially into these components FK. It is also possible to embody them as a separate delivery part with which the vehicle or one of its components (for example the compressed air system or a part of the compressed air system) can be retrofitted. In this respect, the position of the control device 1 in FIG. 5 represents merely one of a large number of possible embodiments.

The control device 1 can include the units 2, 5, MEM and/or NAV described above; individual components or some of these components can, however, also be arranged in the vehicle component FK which is to be actuated in an improved fashion or in the surroundings thereof. Depending on the embodiment, it is possible to actuate just a single component FK or a plurality of components FK by way of the control device 1, as indicated in FIG. 5 via the arrows. The respective components FK, in particular the compressed air system D or the brake system B, can be constructed internally in any desired way. Each component can be connected directly or indirectly to a vehicle engine FM. The vehicle engine FM can be connected via a clutch to the running gear FW, in particular to the driven wheels.

Figure 6:
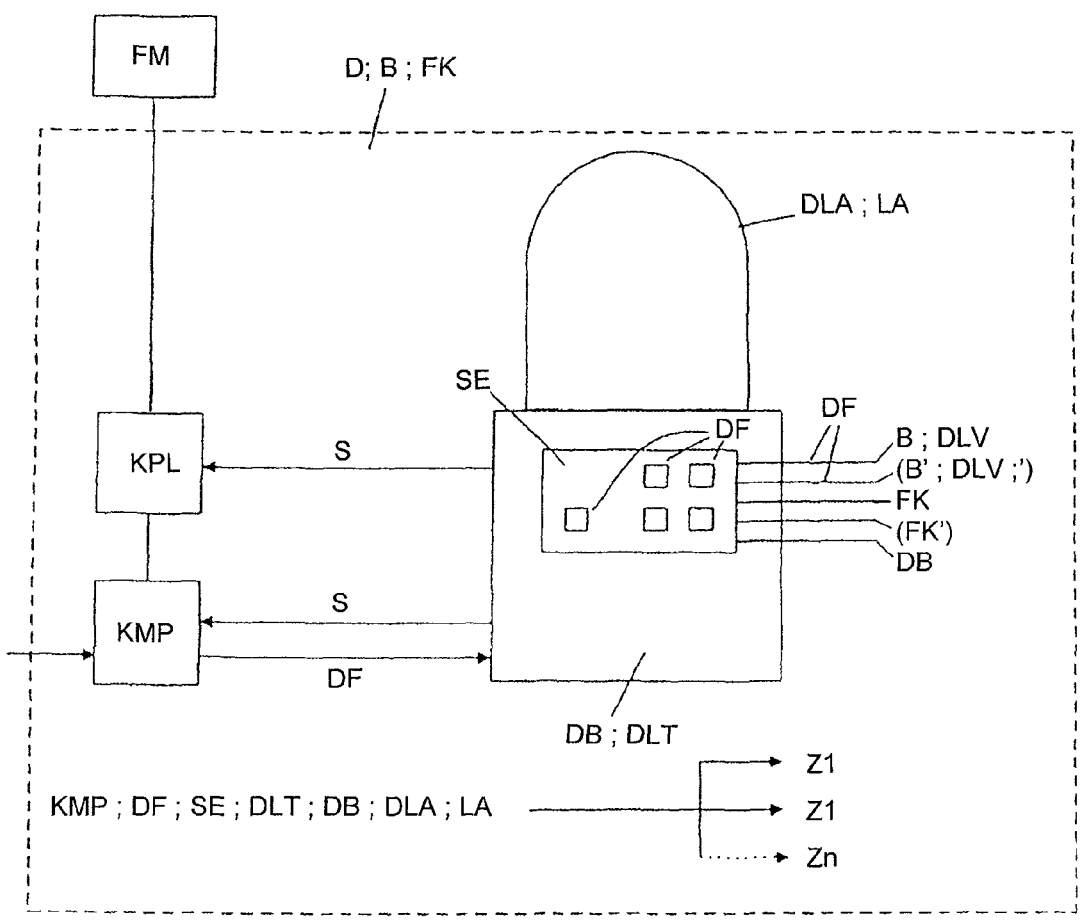
FIG. 6 shows an embodiment of a vehicle component, in particular a compressed air system or brake system, which is controlled according to the invention.

FIG. 6 shows a possible embodiment of a vehicle component which is controlled according to the invention. The component is, in particular, a compressed air system or brake system. It can contain, inter alia, the elements identified as abbreviations in FIG. 6, in particular the elements DB (compressed air vessel), DLT (compressed air distributor), KMP (compressor), DF (delivery line for compressed air), DV (compressed air valve), SE (switching unit), DLA (compressed air supply unit), LA (air supply unit), SE (switching unit), one or more brake circuits (B; B'); one or more other compressed air consumers (DLV; DLV') and/or vehicle components FK; FK' or subcomponents which are controlled by use of compressed air. In addition, a clutch KPL can be actuated. Each of these above-mentioned components can, for example, be controlled as set forth herein. In this context, in particular it is possible, depending on the type of prediction generated and the control signals (and/or prediction data PD) transmitted as a result, to control when which components are operated in which state (for example a first state Z1, a second state Z2 or, if appropriate, also further states Zn). The decision as to when which operating state is brought about can be made as a function of altitude position data HD and altitude profile data, as a result of which the method of operation of the respective vehicle components is improved.

Figure 7:
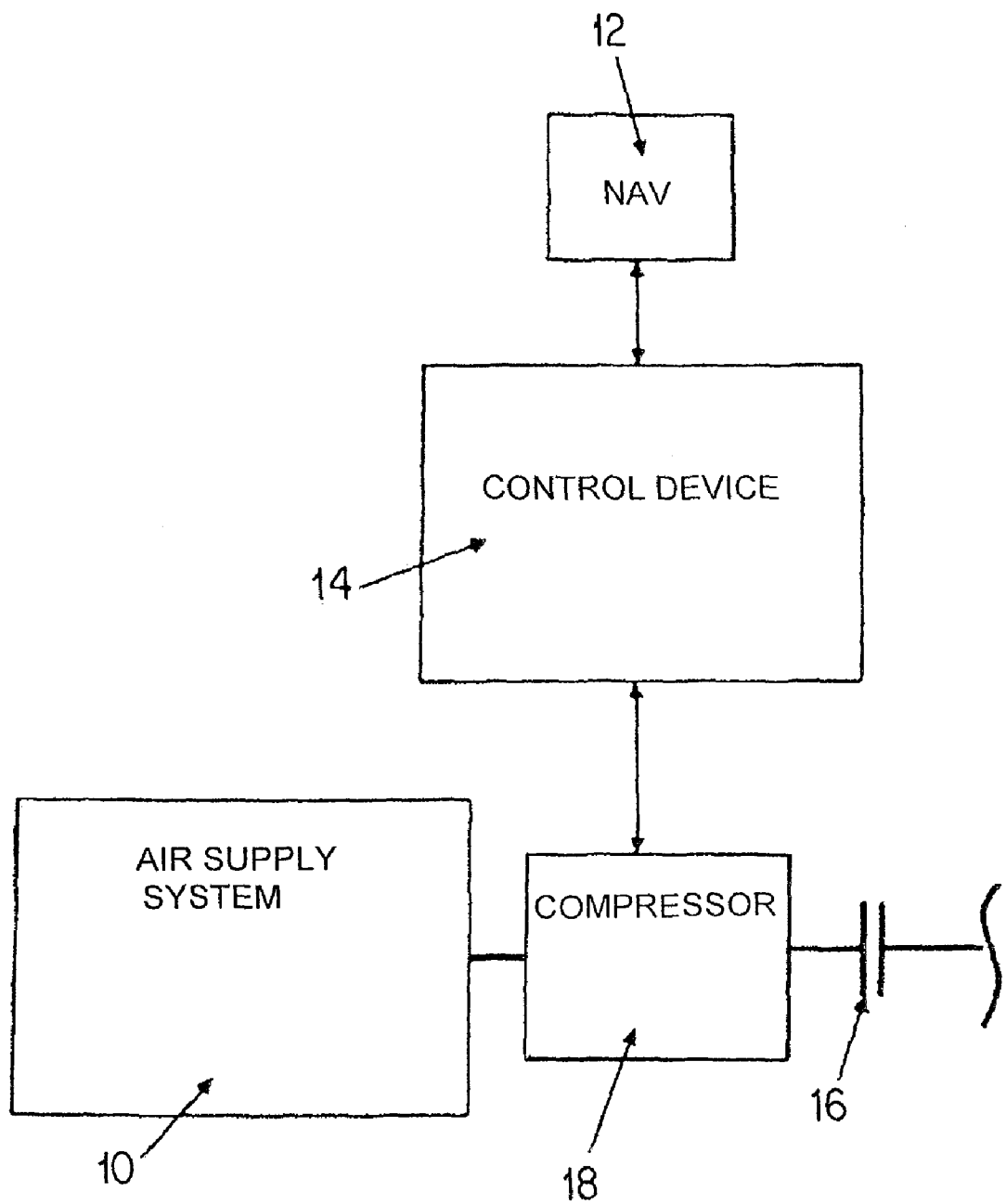
FIG. 7 is a schematic illustration of an exemplary device according to the invention for determining overrun conditions of a vehicle, which device is suitable for carrying out the method according to the invention.

FIG. 7 is a schematic illustration of a device for determining overrun conditions of a vehicle, which device is suitable for carrying out the method according to the invention. Before the method is explained by reference to FIGS. 8 and 9, details will first be given on the design of the device for determining at least one instance of an overrun condition of a vehicle which is expected to occur. The device will be described in this case in conjunction with an air supply system 10 of a vehicle, and in this context it is likewise possible to use different vehicle components in conjunction with the device instead of or parallel to the air supply system 10. In the case illustrated, the device includes an air supply system 10, which is coupled pneumatically to a compressor 18, which is not of particular interest here, and the compressor 18 can be operated to supply compressed air. The compressor 18 is driven by a drivetrain 16 (only illustrated partially), and in this context transmission of torque to the compressor 18 via the drivetrain 16 can be interrupted, for example, by use of a clutch.

The drivetrain 16 originates from an internal combustion engine (not shown and not of particular interest). The drivetrain 16 can be provided, in particular, as a separate drivetrain for the compressor 18 or it can be branched off from a main drivetrain, coupled to a transmission, of the internal combustion engine. The compressor 18 is actuated in order to vary the air supply operation by a processing device, for example a control device 14 or a controller 14. The control device 14 is also used to interrupt the transmission of torque to the compressor 16 by actuating the clutch. The control device 14 is in this case a control device which is known to a person skilled in the art and which can carry out calculation functions, processing functions, and open-loop and closed-loop control functions.

The control device 14 acquires data or information from a navigation system 12 via, inter alia, a connection which is suitable for exchanging data. The navigation system 12 is in this case a conventional navigation system 12 which is suitable for transmitting both data which correlates with position indications of the vehicle and data which correlates with altitude indications, to the control device 14. In particular, the navigation system 12 is suitable for supplying the control device 14 with data which correlates with altitude profiles for sections of road, from which profiles negative gradients and positive gradients of the corresponding sections of road which the vehicle is traveling along or is to travel along can be calculated.

Figure 8:
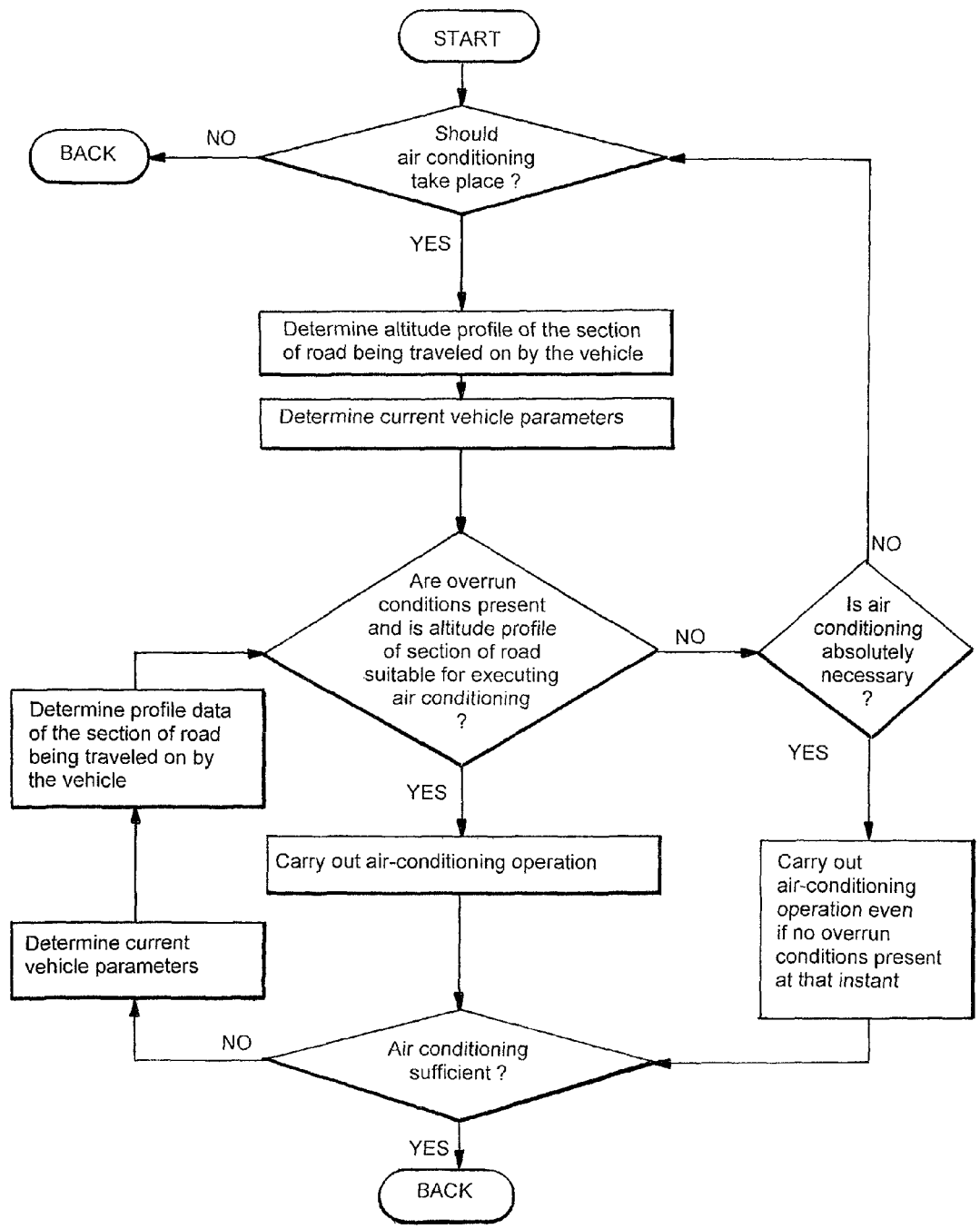
FIG. 8 is a flowchart of a method according to the invention for determining overrun conditions which are expected to occur, in conjunction with an air supply system according to a first exemplary embodiment of the invention.

FIG. 8 is a flowchart of a method for determining overrun conditions which are expected to occur, in conjunction with the air supply system 10 in FIG. 7 according to a first exemplary embodiment of the invention. The following steps are carried out in this exemplary embodiment entirely by the processing device or the control device 14. In this context it is to be noted that the control can also be carried out by different processing devices or control devices which communicate with one another and correspondingly exchange data.

At the start of the method, an interrogation as to whether air supply or delivery of compressed air is to be carried out by way of an air supply operation is made in step S100. The interrogation of step S100 is linked, for example, to requirements relating to the compressed air supply prevailing in individual compressed air circuits which are coupled to the air supply system 10. Inter alia, one requirement may be the compressed air state of a compressed air vessel which is assigned to a compressed air circuit. The compressed air circuits which are coupled to the air supply system can be, in particular, brake circuits, secondary consumer circuits, a trailer supply circuit, a parking brake circuit, an air suspension circuit, etc.

If it is detected that no compressed air supply is to take place, for example because the compressed air level of the corresponding compressed air circuit is sufficient, the method ends at this point and starts again from the beginning. If it is assessed that compressed air supply is to take place, for example because the compressed air level of at least one compressed air accumulator is below a predetermined limiting value, the method moves forward to step S101.

At step S101, the control device 14 acquires altitude profile data on a section of road which is being traveled along and is to be traveled along by the vehicle. Since a destination has not been predefined to the navigation system 12 in this exemplary embodiment, the navigation system 12 transmits to the control device 14 current altitude profile data, or altitude profile data calculated in advance up to a predetermined degree, on the section of road lying ahead of the vehicle. In this case, the altitude profile data of the section of road being traveled along by the vehicle include the profile data of the section of road from the current position of the vehicle up to a predetermined position. The section of road lying ahead of the vehicle is preferably predefined by the length of the road on which the vehicle is located at the current time. The predetermined position can be freely defined and can be predetermined as desired between the current position of the vehicle and the end of the road. The control device 14 then calculates positive gradients and negative gradients at the current position of the vehicle and/or of the profile of the section of road up to the predetermined position from the altitude profile data of the section of road being traveled along by the vehicle.

Next, in step S102, current vehicle parameters are determined. The current vehicle parameters include, inter alia, at least one element composed of position data and altitude data of the vehicle which are obtained from the navigation system 12, distance data obtained from a driver assistance system relating to a further vehicle which is traveling ahead in relation to the vehicle, a vehicle speed, in particular wheel speeds and/or yaw rates, a vehicle acceleration, the current compressed air level of the brake system, a humidity level of a compressed air cartridge of the brake system, an engine speed, an engine torque and its sign, clutch data and/or gearspeed data of the vehicle and retard data of the vehicle, etc.

After the current vehicle parameters have been determined in step S102, the method proceeds to step S103. In step S103, there is, on the one hand, an interrogation as to whether overrun conditions of the vehicle are present. The overrun conditions of the vehicle are determined in this exemplary embodiment at least partially as a function of one or more of the current vehicle parameters and can additionally also be determined as a function of the altitude profile data of the section of road which is being traveled along. On the other hand, it is interrogated whether the determined altitude profile data of the section of road are suitable for carrying out an air supply operation. In particular, if a negative gradient is present on the section of road, it is assessed whether the execution of the air supply operation can be performed. If the altitude profile data are calculated in advance from the current position up to the predetermined position, the assessment can also be carried out taking into account the section of road lying ahead of the vehicle, for example by way of the length of the negative gradient. If the length of the negative gradient is large enough, the execution of the air supply operation is particularly favored. If it is detected in step S103 that overrun conditions of the vehicle are present and that the altitude profile of the section of road is suitable for executing the air supply operation, the method proceeds to step S104 in which the air-conditioning operation is carried out. In particular, in this case the compressor 18 is operated in order to deliver compressed air or feed compressed air to the corresponding compressed air circuits. Then, in step S105 it is assessed whether the air supply from step S104 was sufficient. For example, this assessment is carried out by checking the compressed air level of the air vessels of the corresponding compressed air circuits. If the air supply was sufficient, the method ends and starts again from the beginning. However, if it is assessed that the air supply was not sufficient, in steps S106 and S107 the current vehicle parameters and the altitude profile data of the section of road being traveled on are determined again in a manner analogous with steps S101 and S102. This is due to the fact that in the meantime changes may have occurred to the corresponding data since the position of the vehicle may have changed in the meantime. Then, the abovementioned interrogation is carried out again in step S103.

If it is decided in step S103 that overrun conditions of the vehicle are not present or the altitude profile for the section of road is unsuitable for executing the air supply operation, the method proceeds to step S109. There, a further interrogation as to whether the air supply is absolutely necessary takes place. This may be the case, for example, when at least one compressed air level of a compressed air vessel of a corresponding compressed air circuit has dropped below a critical level. If this is the case, the air supply operation is carried out even when no overrun conditions of the vehicle are present at that instant or on the basis of an unsuitable altitude profile of the section of road. Then, the interrogation explained above in step S105 is carried out again. However, if it is detected in step S109 that air supply is not absolutely necessary, such as the compressed air level is, for example, above the critical level, then the method returns to the step S100 described above.

Figure 9:
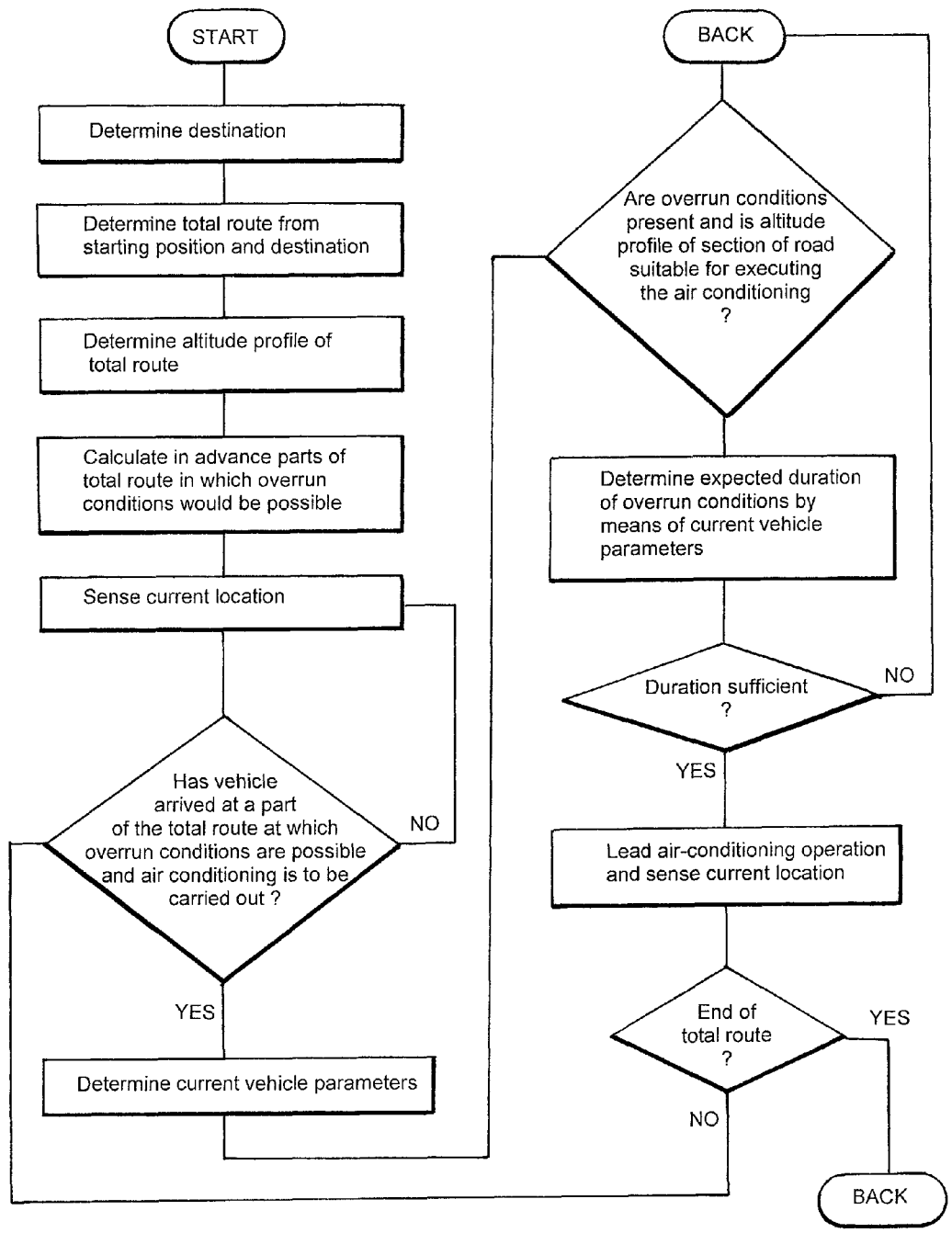
FIG. 9 is a flowchart of the method according to the invention for determining overrun conditions which are expected to occur, in conjunction with the air supply system according to a second exemplary embodiment of the invention.

FIG. 9 is a flowchart of the method according to the invention for determining overrun conditions which are expected to occur, in conjunction with the air supply system 10 from FIG. 7 according to a second exemplary embodiment of the invention. In this exemplary embodiment, the method starts at step S201 with the determination of a destination which has been entered into the navigation system 12 and transmitted to the control device 14. Furthermore, the control device 14 in step S202 obtains the total route which is to be traveled along and covered by the vehicle from the navigation system 12, which total route results in each case from the current starting position and the destination of the vehicle. Likewise, in step S203 the navigation system 12 transmits a total route altitude profile of the total route to be covered to the control device 14. In step S204, the control device 14 then calculates therefrom parts of the total route in which overrun conditions of the vehicle could occur and which would be suitable for executing an air supply operation.

In step S205, the current location of the vehicle is obtained. Then, in step S206 an interrogation is made to determine whether the vehicle has arrived at a calculated section at which overrun conditions would be possible and whether air supply is to be carried out. In this context the interrogation of the execution of the air supply depends on the same criteria as in step S100 in FIG. 8. If the vehicle has not yet arrived at the section calculated in advance or if air supply is not to be carried out, the method returns to step S205 until both conditions interrogated in step S206 are met. It is to be noted that in this case an interrogation according to steps S109 and S108 is dispensed with for the sake of simplicity. However, in each case an air supply mode is carried out if absolutely necessary, as is described above in conjunction with steps S109 and S108.

If the conditions of the interrogation in step S206 are met, the method proceeds to step S207 in which the current vehicle parameters are determined in a way analogous with step S102 in FIG. 8. Then, the step S208 is carried out in which, in the same way as in step S103 in FIG. 8, it is interrogated whether overrun conditions are present and it is preferably verified a further time whether the altitude profile of the section of road is suitable for executing the air supply operation. If this is not the case, the method ends and if appropriate it starts again from the beginning.

If it is detected in step S208 that the overrun conditions of the vehicle are present and the altitude of the section of road is correspondingly suitable, the method proceeds to step S209. In step S209, an expected duration of the overrun conditions is determined by means of the current vehicle parameters. In particular, the duration of the overrun conditions is determined at least from the vehicle speed and the segment of the section of road lying ahead of the vehicle. Next, the step S210 is carried out, in which it is interrogated whether the duration is sufficient for the execution of the air supply operation. In particular, the calculated expected duration is compared with a predetermined limiting value which indicates a minimum duration of the overrun conditions and can be defined as desired. If the expected duration is not sufficient, the method ends and if appropriate starts again from the beginning. If the duration is sufficient, in step S211 the air supply operation is carried out and then the current location of the vehicle is determined.

Alternatively or additionally, in step S210 the distance from a vehicle traveling ahead can also be checked and, in a manner analogous with the assessment of the expected duration of the overrun conditions, it is possible to assess, by means of the distance data, whether air supply is to be carried out. Then, in step S212, it is interrogated whether the end of the total route, that is to say the destination, has been reached. If this is not the case, the method returns to step S206 and remains in the interrogation loop S206 and S205 until the next part, calculated in advance, at which overrun conditions would be possible is reached. If it is detected in step S212 that the end of the total route has been reached, the method ends and starts again from the beginning, if appropriate.

TABLE OF REFERENCE SYMBOLS

1 Control device
2 Processing unit
10 Air-conditioning system
12 Navigation system
14 Control device
16 Drivetrain
18 Compressor
20 Vehicle
B Brake system
D Compressed air system
DF Delivery line for compressed air
DL Compressed air
DLA Compressed air supply unit
DB Compressed air vessel
DLV Compressed air consumer
DLT Compressed air distributor
DP Compressed air cartridge
DV Compressed air valve
E Distance
F Section of road
FK Vehicle component
FM Vehicle engine
G Negative gradient
GS Segment of section of road with a negative gradient
HD Altitude position data
K Component of the compressed air system
KMP Compressor
KPL Clutch
L Length
LA Air supply unit
Lmin Minimum length
MEM Memory unit
NAV Navigation system
OK Location coordinates
P Vehicle parameter
P Prediction
PD Prediction data
R Direction of travel
S Control signal
SA Segment of section of road
SE Switching unit
SP; SPn Overrun condition phase
SP0 Instantaneous overrun condition phase
ta Time of start of an overrun condition phase
tb Time of end of an overrun condition phase
Td; Tn Chronological duration of an overrun condition phase
Tmin minimum duration
TV Time interval to overrun condition phase
T0 Remaining duration of an instantaneous overrun condition phase
Z1 First state
Z2 Second state
Zn Further state
x; y Geographic position
z Vertical position The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for a compressed air system or a component of the compressed air system of a vehicle, comprising:
a processing unit operatively configured to calculate a prediction about occurrence and a duration of overrun condition phases of the vehicle using received altitude position data of a section of road upon which the vehicle is traveling or is to travel along; and
wherein the processing unit is further operatively configured to check, for control purposes, whether the calculated prediction about the duration of an overrun condition phase is longer than a predefined minimum duration, said processing unit controlling at least one of the compressed air system, the component of the compressed air system, and a component for operating the compressed air system using the calculated prediction and a result of checking whether the calculated prediction about the duration of an overrun condition phase is longer than a predefined minimum duration.

2. The control device as claimed in claim 1, wherein the processing unit calculates a prediction which indicates whether and where overrun condition phases are expected to occur along a segment of the section of road respectively lying ahead of the vehicle.

3. The control device as claimed in claim 1, wherein the processing unit calculates a prediction which indicates whether and when overrun condition phases will occur in a respectively imminent time period.

4. The control device as claimed in claim 1, wherein the control device calculates a prediction about an expected start and/or end time of overrun condition phases, a time interval until an occurrence of overrun condition phases, or a chronological duration of overrun condition phases.

5. The control device as claimed in claim 1, wherein the processing unit defines, by way of the calculated prediction, execution times of switching processes by which the component of the compressed air system or the component provided for operating the compressed air system is optionally adjustable at least from a first state into a second state or vice versa using predicted overrun condition phases.

6. The control device as claimed in claim 5, wherein the processing unit actuates a clutch connected between a vehicle engine and a compressor of the compressed air system.

7. The control device as claimed in claim 6, wherein in the first state the clutch couples the compressor to the vehicle engine, and in the second state it prevents the engagement of the clutch, or vice versa.

8. The control device as claimed in claim 5, wherein the processing unit actuates at least one compressor which in the first state delivers compressed air to a compressed air distributor, a compressed air supply unit, a compressed air consumer or to another component, and which in the second state causes compressed air to be delivered in a different manner than in the first state.

9. The control device as claimed in claim 8, wherein in the first state the compressor supplies the air supply unit with compressed air, and in the second state said compressor is switched into an idling state in which the air supply unit is not supplied with compressed air or only with compressed air at a lower pressure than in the first state.

10. The control device as claimed in claim 5, wherein the processing unit controls a compressed air valve which in the first state passes on compressed air, and in the second state blocks or reverses the passing on of compressed air.

11. The control device as claimed in claim 5, wherein the processing unit actuates a compressed air distributor which in the first state takes up compressed air and passes it on, and which in the second state prevents the taking up of compressed air.

12. The control device as claimed in claim 5, wherein the processing unit actuates a compressed air supply unit which has a compressed air cartridge, wherein in the first state the compressed air supply unit permits, as a result of the control taking place by way of the calculated prediction, a cleaning and passing on of new compressed air through the compressed air cartridge through to at least one compressed air consumer, and in the second state said compressed air supply unit regenerates the compressed air cartridge.

13. The control device as claimed in claim 12, wherein the control device controls the compressed air system or the component by way of the calculated prediction such that times at which regeneration of the compressed air cartridge are carried out, are influenced using the predicted overrun condition phases.

14. The control device as claimed in claim 1, wherein the processing unit actuates the component as a function of the altitude position data of the section of road and received location coordinates of the vehicle such that the component is in a first state during the overrun condition phases or during selected overrun condition phases and is in a second state or in further states at least outside the overrun condition phases.

15. The control device as claimed in claim 14, wherein the processing unit actuates the component such that the component is in the first state during such overrun condition phases whose expected duration is longer than a predefined minimum duration and is otherwise in the second state or in further states.

16. The control device as claimed in claim 1, wherein, in at least one operating state of the compressed air system, the processing unit controls the compressed air system, the component of the compressed air system or the component provided for operating the compressed air system using the calculated prediction.

17. The control device as claimed in claim 1, wherein the processing unit actuates a vehicle component which is directly or indirectly connected between a vehicle engine and at least one compressed air consumer of the compressed air system.

18. The control device as claimed in claim 1, wherein the processing unit actuates a vehicle component which is connected upstream of compressed-air-conducting components of the compressed air system and influences an effect of a vehicle engine on the compressed air system.

19. The control device as claimed in claim 1, wherein the processing unit also calculates said prediction using received location coordinates which indicate an instantaneous position of the vehicle along the section of road.

20. The control device as claimed in claim 19, wherein a control device controls a compressed air supply of at least one of: a brake system, a component of a brake system, a compressed air distributor, a delivery line for compressed air, and a pneumatic control line as a function of the altitude position data of the section of road and of the received location coordinates of the vehicle.

21. The control device as claimed in claim 1, wherein the control device controls the compressed air system or the component by way of the calculated prediction such that at least one of delivery of compressed air and taking up of compressed air takes place exclusively during predicted overrun condition phases.

22. The control device as claimed in claim 21, wherein the control device controls the compressed air system or the component by way of the calculated prediction such that at least one of delivery of compressed air and taking up of compressed air takes place during overrun condition phases whose duration exceeds a predefined, defined or parameter-dependent minimum duration.

23. The control device as claimed in claim 1, wherein the processing unit calculates in advance, from the altitude position data of the section of road and from a direction of travel determined from received location coordinates of the vehicle along the section of road, where a section of road with a negative gradient will respectively occur in the direction of travel on the section of road or on a segment of the section of road lying directly ahead of the vehicle.

24. The control device as claimed in claim 23, wherein the processing unit calculates at least one of: a time interval to imminent overrun condition phases, a chronological duration of the overrun condition phases themselves, and times of their start and/or their end, by way of the sections of road with the negative gradient which are calculated in advance.

25. The control device as claimed in claim 1, wherein the processing unit calculates a prediction for the expected time period of overrun condition phases which have already begun and/or are imminent, and compares them with the predefined minimum duration, and causes overrun condition phases having calculated time periods longer than the predefined minimum duration to at least one of: (i) deliver compressed air by way of a compressor in the direction of a compressed air distributor or a compressed air consumer, (ii) take up air by way of the compressed air distributor, (iii) switch at least one compressed air valve from a first state into a second state, and (iv) switch a clutch.

26. The control device as claimed in claim 1, wherein the processing unit calculates, for the purpose of control, a distance along the section of road and/or a travel time, after which a first overrun condition phase whose duration is expected to exceed the predefined minimum period will occur.

27. The control device as claimed in claim 1, wherein the processing unit compares lengths of sections of road with a negative gradient lying ahead with a predefined minimum length and outputs prediction data which permits targeted utilization of overrun condition phases on only those sections of road with a negative gradient whose length exceeds the predefined minimum length.

28. The control device as claimed in claim 27, wherein the processing unit uses, for said comparison, limiting values which depend on one or more instantaneous vehicle parameters.

29. The control device as claimed in claim 1, wherein, for an instantaneous overrun condition phase which has already started, the processing unit calculates a prediction about the expected remaining chronological duration of this overrun condition phase.

30. The control device as claimed in claim 1, wherein the processing unit generates in each case a control signal for an expected imminent or already started overrun condition phase, said control signal defining, as a function of the expected remaining chronological duration of this overrun condition phase, whether or not technical utilization of this overrun condition phase is to be brought about, which utilization causes compressed air for at least one vehicle component to be generated, delivered, passed on, conditioned or stored.

31. The control device as claimed in claim 30, wherein the processing unit generates in each case a control signal for an overrun condition phase which has already started, said control signal then causing technical utilization of this overrun condition phase when the expected, still remaining chronological duration of the instantaneous overrun condition phase exceeds a predefined limiting value, which utilization causes compressed air for at least one vehicle component to be generated, delivered, passed on, conditioned or stored.

32. The control device as claimed in claim 1, wherein, for instantaneous or future overrun condition phases whose chronological duration is in each case expected to be shorter than a predefined chronological minimum duration and which precede the calculated earliest future overrun condition phase with a longer duration than the predefined minimum duration, the processing unit prevents technical utilization of these preceding shorter overrun condition phases.

33. The control device as claimed in claim 1, wherein the control device processes, for the purpose of control, current vehicle parameters, wherein the current vehicle parameters comprise at least one of: received location coordinates or received altitude position data of the vehicle, vehicle speed, wheel speeds, yaw rates, vehicle acceleration, a compressed air level of a brake system, a humidity level of a compressed air vessel or a compressed air supply cartridge, an engine speed, an absolute value and/or sign of an engine torque, clutch data, gearspeed data, retarder data of the vehicle, a distance from another vehicle traveling ahead.

34. The control device as claimed in claim 33, wherein the location data which are processed by the processing unit each indicate the instantaneous position of the traveling vehicle along the section of road.

35. The control device as claimed in claim 1, further comprising a navigation device which receives location coordinates indicative of an instantaneous position of the vehicle along the section of road, and passes said location coordinates onto the processing unit.

36. The control device as claimed in claim 35, wherein the control device, the navigation device thereof, or the processing unit thereof, has a memory unit in which the altitude position data of the section of road are stored.

37. The control device as claimed in claim 35, wherein the navigation device also receives the altitude position data of the section of road and passes it onto the processing unit.

38. The control device as claimed in claim 37, wherein the altitude position data are vertical position coordinates of a plurality of points or sections on the section of road which is being traveled along or is to be traveled along.

39. The control device as claimed in claim 35, wherein the navigation device of the control device receives not only the coordination data of the vehicle but also altitude position data indicative of an instantaneous altitude position of the vehicle.

40. The control device as claimed in claim 35, wherein the navigation device comprises a GPS receiver.

41. The control device as claimed in claim 1, wherein the control device carries out the control by use of pneumatic control signals.

42. The control device as claimed in claim 41, wherein the control device controls air pressure of a pneumatic control line, which leads from a compressed air distributor to a compressor.

43. The control device as claimed in claim 1, wherein the control device carries out the control by use of electrical or optical control signals.

44. A method of operating a compressed air system or a component of the compressed air system of a vehicle, the method comprising the acts of:
   receiving altitude position data about a section of road on which the vehicle is traveling or is to travel;
   calculating a prediction about an occurrence and a duration of overrun condition phases of the vehicle as a function of the received altitude position data; and
   controlling at least one of the compressed air system, the component of the compressed air system, and a component for operating the compressed air system using the calculated prediction about the occurrence and the duration of overrun condition phases of the vehicle.

45. The method according to claim 44, further comprising the act of:
   checking whether the calculated prediction about the duration of an overrun condition phase is longer than a predefined minimum duration; and
   using a result of the checking act for controlling the compressed air system, the component of the compressed air system, or the component provided for operating the compressed air system.

46. The method according to claim 44, wherein the calculated prediction comprises information about whether and where overrun condition phases are expected to occur along the section of road ahead of the vehicle.

* * * * *